United States Patent
Belwadi et al.

(10) Patent No.: US 8,412,709 B1
(45) Date of Patent: Apr. 2, 2013

(54) DISTRIBUTED INFORMATION COLLECTION USING PRE-GENERATED IDENTIFIER

(75) Inventors: Subramanya Srikanth Belwadi, Bangalore (IN); Ravi Yadavilli, Hyderabad (IN); Surendra Ruhela, Hyderabad (IN); Suresh Khanna, San Francisco, CA (US)

(73) Assignee: Google Inc., Mountain View, CA (US)

( * ) Notice: Subject to any disclaimer, the term of this patent is extended or adjusted under 35 U.S.C. 154(b) by 525 days.

(21) Appl. No.: 12/605,230

(22) Filed: Oct. 23, 2009

Related U.S. Application Data

(60) Provisional application No. 61/107,900, filed on Oct. 23, 2008.

(51) Int. Cl.
*G06F 7/00* (2006.01)
*G06F 17/30* (2006.01)
(52) U.S. Cl. .................................................. 707/736
(58) Field of Classification Search ............. 707/736
See application file for complete search history.

(56) References Cited

U.S. PATENT DOCUMENTS

| | | | |
|---|---|---|---|
| 6,968,513 B1 | 11/2005 | Rinebold et al. | |
| 6,973,448 B1 | 12/2005 | Monberg et al. | |
| 7,054,886 B2 | 5/2006 | Stern et al. | |
| 7,620,725 B2 | 11/2009 | King et al. | |
| 8,015,058 B2 | 9/2011 | Fowler et al. | |
| 2002/0032677 A1 | 3/2002 | Morgenthaler et al. | |
| 2002/0152134 A1* | 10/2002 | McGlinn | 705/26 |
| 2002/0169631 A1 | 11/2002 | Lewis | |
| 2004/0204958 A1* | 10/2004 | Perkins et al. | 705/1 |
| 2008/0082433 A1 | 4/2008 | Hodges et al. | |
| 2008/0109875 A1 | 5/2008 | Kraft | |
| 2008/0263016 A1 | 10/2008 | Lokitz | |
| 2010/0161816 A1 | 6/2010 | Kraft et al. | |
| 2011/0010304 A1 | 1/2011 | Wong et al. | |

* cited by examiner

*Primary Examiner* — Hosain Alam
*Assistant Examiner* — Van Oberly
(74) *Attorney, Agent, or Firm* — Fish & Richardson P.C.

(57) ABSTRACT

The subject matter of this specification can be implemented in, among other things, a computer-implemented method including selecting a person as a representative to collect information from businesses. The method further includes generating identifiers to be associated with the information. The method further includes providing the identifiers to the representative. The method further includes receiving business information that has been directly collected from a business among the businesses by the representative and an indication of a particular one of the identifiers to be associated with the directly collected business information. The method further includes storing the received business information with the associated particular identifier in a database. The method further includes, after storing the received business information with the particular identifier in the database, receiving authentication information including the particular identifier. The method further includes allowing modification of the stored business information by the interface of the business.

17 Claims, 10 Drawing Sheets

330

```
Business Name:        _____

Address 1:            _____

Street / Road:        _____

Locality:      _____    Landmark:  _____

City:          _____    Postal Code: ☐☐☐☐☐☐

Phone 1:       _____    Phone 2:   _____

Mobile Phone:  _____    Fax:       _____

Website:              _____

Email:                _____

Business Description: _____

Business Category Code: _____
```

┌─────────────────────────────────┐
│                                 │
│      PIN sticker with           │
│      business type              │
│                                 │
└─────────────────────────────────┘

FIG. 3D

DISTRIBUTED INFORMATION COLLECTION USING PRE-GENERATED IDENTIFIER

CROSS-REFERENCE TO RELATED APPLICATIONS

This application claims the benefit of U.S. Provisional Application Ser. No. 61/107,900, filed on Oct. 23, 2008, and entitled "Distributed Information Collection Using Pre-Generated Identifier," the contents of which are hereby incorporated by reference.

TECHNICAL FIELD

This instant specification relates to distributed information collection.

BACKGROUND

Advertising over interactive media has become popular in recent years. For example, as the number of people using the Internet has exploded, businesses and advertisers have come to appreciate media and services offered over the Internet as a potentially powerful way to communicate with customers. Similarly, businesses and advertisers have become aware of the increasing power and sophistication of hand-held devices, such as cellular or other mobile telephones, and the growing opportunities with such devices.

Conventional interactive advertising provides opportunities for advertisers to target their advertisements ("ads") to a receptive audience. Typically targeted ads are more likely to be useful to end users since the ads may be relevant to a need, for example, inferred from some user activity (e.g., relevant to a user's search query to a search engine, relevant to content in a document requested by the user, relevant to the user's geographic location, etc.).

SUMMARY

In general, this document describes distributed information collection using a pre-generated identifier. In a first aspect, a computer-implemented method includes obtaining, at a central hub from one or more user interfaces through a network, identification information of one or more persons interested in collecting information from one or more businesses. The method further includes selecting, by the central hub, at least one of the persons as a representative to directly collect the information from the businesses. The method further includes generating, at the central hub, one or more identifiers to be associated with the information directly collected from the businesses by the representative. The method further includes providing the identifiers to the representative. The method further includes after the central hub generates the one or more identifiers, receiving, at the central hub from at least one interface of the representative through a network, business information that has been directly collected from a business among the businesses by the representative and an indication of a particular one of the identifiers to be associated with the directly collected business information. The method further includes associating the received business information with the particular identifier. The method further includes storing the received business information with the particular identifier in a database at the central hub. The method further includes making the stored business information electronically available over the network. The method further includes after storing the received business information with the particular identifier in the database at the central hub, receiving, at the central hub from at least one interface of the business through the network, authentication information includes the particular identifier. The method further includes in response to receiving the authentication information includes the particular identifier, allowing modification of the stored business information by the interface of the business.

Implementations can include any, all, or none of the following features. The method can include receiving a search request from a remote user interface, associating the search request with a geographic area, and providing business information for one or more businesses in the vicinity of the geographic area to the remote user interface including the stored business information for the business. The business information can include a name of the business, an address of the business, a phone number of the business, and geographic location information for the business. The method can include conducting a review of the received business information to determine whether the information is accurate. The method can include conducting a review of the received business information to determine whether the information is fraudulent. The method can include electronically providing the one or more generated identifiers to the interface of the representative. The method can include receiving the business information from the interface of the representative remotely without personal or telephone contact with the representative.

In a second aspect, a computer-implemented system includes a central hub to interface databases and applications, and that connects with at least one remote interface over a network. The system further includes a registration application to electronically obtain identification information from persons interested in collecting business information, select at least one of the interested persons as a representative to directly collect the business information, and electronically providing the one or more generated identifiers to the representative. The system further includes an identifier generator application to generate one or more identifiers to be associated with information directly collected from one or more businesses by the representative. The system further includes an information collection application to receive, from the remote interface, business information that has been directly collected from a business by the representative and to receive an indication of a particular one of the identifiers to be associated with the received business information. The system further includes a business information database to store and associate the received business information with the particular identifier. The system further includes a business information application to make the stored business information electronically available over a network.

Implementations can include any, all, or none of the following features. The information collection application can receive the business information from the remote interface of the representative without personal or telephone contact with the representative.

In a third aspect, a tangible computer program product, having recorded and stored thereon program code operable to cause one or more machines to perform operations, the operations including obtaining, at a central hub from one or more user interfaces through a network, identification information of one or more persons interested in collecting information from one or more businesses. The operations further include selecting, by the central hub, at least one of the persons as a representative to directly collect the information from the businesses. The operations further include generating, at the central hub, one or more identifiers to be associated with the information directly collected from the businesses by the representative. The operations further include providing the identifiers to the representative. The operations further include after the central hub generates the one or more identifiers, receiving, at the central hub from at least one interface of the representative through a network, business information that has been directly collected from a business among the businesses by the representative and an indication of a particular one of the identifiers to be associated with the directly collected business information. The operations further include associating the received business information with the particular identifier. The operations further include storing the received business information with the particular identifier in a database at the central hub. The operations further include making the stored business information electronically available over the network. The operations further include after storing the received business information with the particular identifier in the database at the central hub, receiving, at the central hub from at least one interface of the business through the network, authentication information includes the particular identifier. The operations further include in response to receiving the authentication information includes the particular identifier, allowing modification of the stored business information by the interface of the business.

Implementations can include any, all, or none of the following features. The operations can include receiving a search request from a remote user interface, associating the search request with a geographic area, and providing business information for one or more businesses in the vicinity of the geographic area to the remote user interface can include the stored business information for the business. The business information can include a name of the business, an address of the business, a phone number of the business, and geographic location information for the business. The operations can include conducting a review of the received business information to determine whether the information can be accurate. The operations can include conducting a review of the received business information to determine whether the information can be fraudulent. The operations can include electronically providing the one or more generated identifiers to the interface of representative. The business information can be received from the representative remotely without personal or telephone contact with the representative.

The systems and techniques described here may provide one or more of the following advantages. First, a system can provide for distributed collection of business information and efficient creation of an online business listing without a verification or confirmation step from the business. Second, a system can provide for distributed collection of business information and creation of an online business listing where the business does not have Internet access, telephone access, and/or a definite street address. Third, a system can provide for distributed collection of business information and creation of an online business listing where the business is provided, at the time of the collection of business information, with an identifier for later accessing or modifying the business listing. Fourth, a system can provide for quickly creating a business listing and for making the business listing publicly available by not requiring a verification step from the business. Fifth, a system can provide for quickly creating a business listing and for allowing the business to later modify the business listing by providing login information or an identifier at the time the business information for the listing is collected (e.g., rather than sending the login information to the business at a later time).

The details of one or more embodiments are set forth in the accompanying drawings and the description below. Other features and advantages will be apparent from the description and drawings, and from the claims.

DESCRIPTION OF DRAWINGS

FIGS. 3A-E show examples of handouts and forms for use in distributed information collection.

Like reference symbols in the various drawings indicate like elements.

DETAILED DESCRIPTION

This document describes systems and techniques for distributed information collection. One technique enables information concerning a number of businesses to be collected in an effective and efficient manner, and also enables information to be collected about businesses that otherwise may have only a physical location and little or no virtual presence. The technique allows for distributed information collection with little or no initial or ongoing personal interaction in the process by pre-generating one or more identifiers for businesses from which information is collected.

Figure 1A:
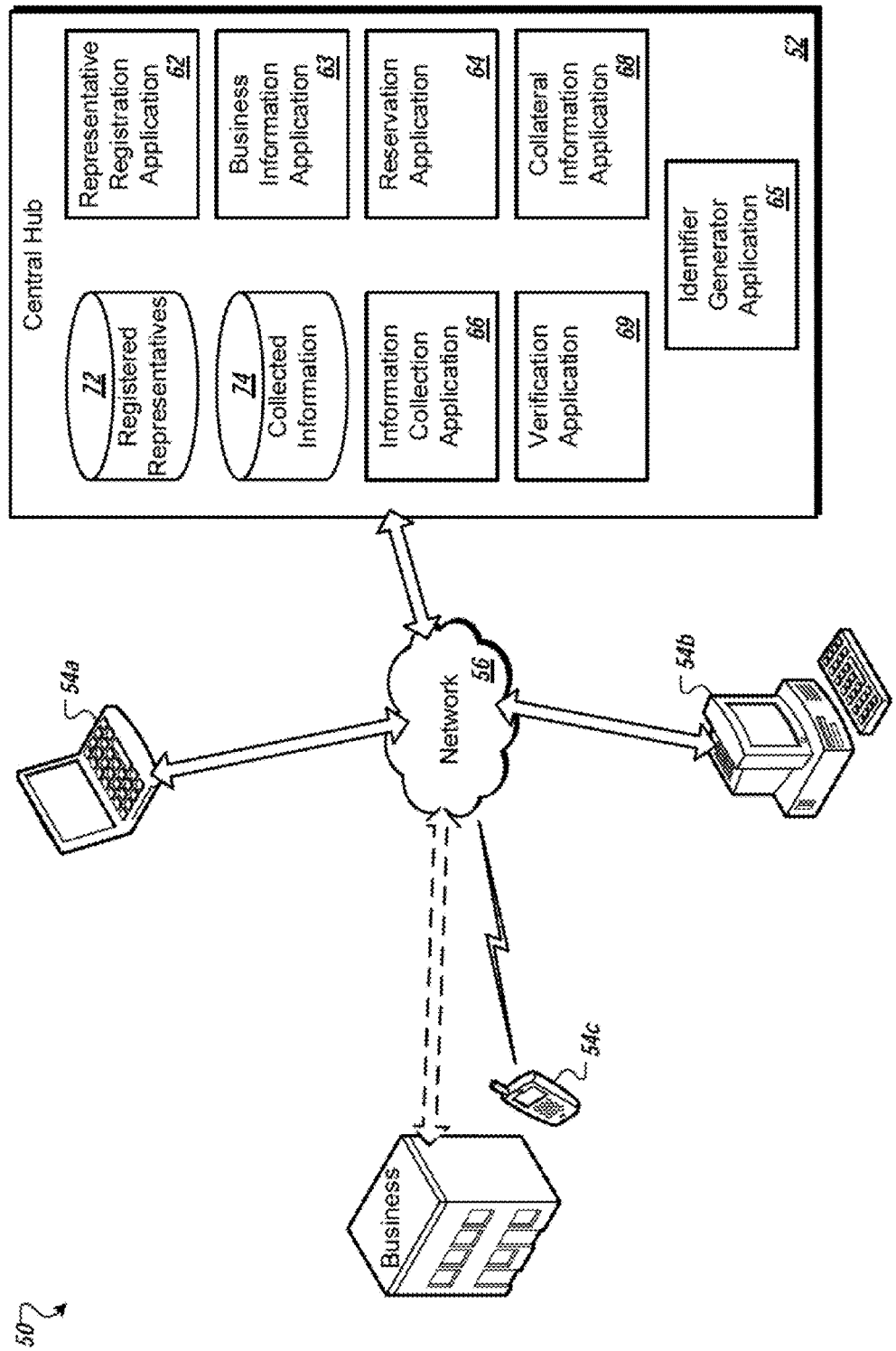
FIG. 1A is a schematic diagram showing an example of an information collection system.

FIG. 1 is a schematic diagram showing an example of a system 50 for distributed information collection. The system 50 includes a central hub 52 and one or more representative interfaces 54a-c coupled by a network 56. The central hub 52 can include one or more applications including an application for registering representatives (i.e., a representative registration application 62), a business information application 63, a reservation application 64, an identifier generator application 65, an information collection application 66, a collateral information application 68, and a verification application 69. The central hub 52 can as well include one or more databases, including a registered representatives database 72 and a collected information database 74. The registered representatives database 72 includes listings of representative information (e.g., name, address, contact information, level, etc.). The collected information database 74 includes listing data associated with businesses (e.g., business names, address, telephone number, storefront photographs, hours of operation, accepted payment types, etc. Though the registered representatives database 72 and the collected information database 74 are shown as separate and within the central hub 52, the databases may be combined or may be external to the central hub 52. Other applications and databases may be included in the system 50. Other configurations will be apparent in light of this disclosure, and the present invention is not intended to be limited to any particular one. The central hub 52 can be of the form of a server (or plural servers) providing services to, for example, the representative interfaces 54a-c.

Each of the representative interfaces 54a-c may be any type of device or system, such as a personal computer or laptop, a mobile phone, a personal digital assistant, special-purpose microcomputer, and so on. Typically, each of the representative interfaces 54a-c includes a browser (or other suitable application) that allows the user to interface and communicate with other devices and systems on the network 56. The representative interfaces 54a-c can be of the form of a client computer (e.g., any device that allows a user to access the central hub 52 via the network 56). Other representative interfaces (not shown) may also be in communication with the central hub 52 via the network 56.

Each of the representative interfaces 54a-c includes an interface that can be implemented, for example, as a plug-in (or other installed executable) or a script file (e.g., JavaScript) associated with a web page provided to the representative interfaces 54a-c by the system 50. The implemented interface can be linked to the various applications described herein. For example, the information collection application 66 allows a representative to provide target business information (e.g., business name, address, business hours, etc.), and to otherwise interact with the central hub 52 and/or the information collection application 66. As a further example, information provided to the information collection application 66 can be provided to and stored in the collected information database 74 over the network 56.

The system 50 operates in conjunction with, and provides interaction between, the applications, the databases, and the representative interfaces 54a-c, and can be implemented with conventional or custom technology. For example, the system 50 can include one or more servers operating under a load balancing scheme, with each server (or a combination of servers) configured to carryout one or more functions required to answer client requests via the network 56. The system 50 can operate using any type of communications network, such as a local area network (e.g., intranet), wide area network (e.g., Internet), WLAN, SAN, or some combination thereof. Alternatively, the network may be a direct connection between the client and the server system. In general, the client, network, and/or server system may be in communication via any type of wired or wireless connection, using a wide variety of communication protocols.

In general, when a representative or other user of the system 50 enters a request (e.g., request, data submission, or other query, hereinafter referred to generally as a "request") (e.g., via browser and client-side application or other such agent), the request is formatted as required (e.g., by one of the representative interfaces 54a-c or other user interface) and sent to the central hub 52 via the network 56. The system 50 then determines what the request is for, and engages the appropriate application and/or database to generate the appropriate response to the request.

Figure 1B:
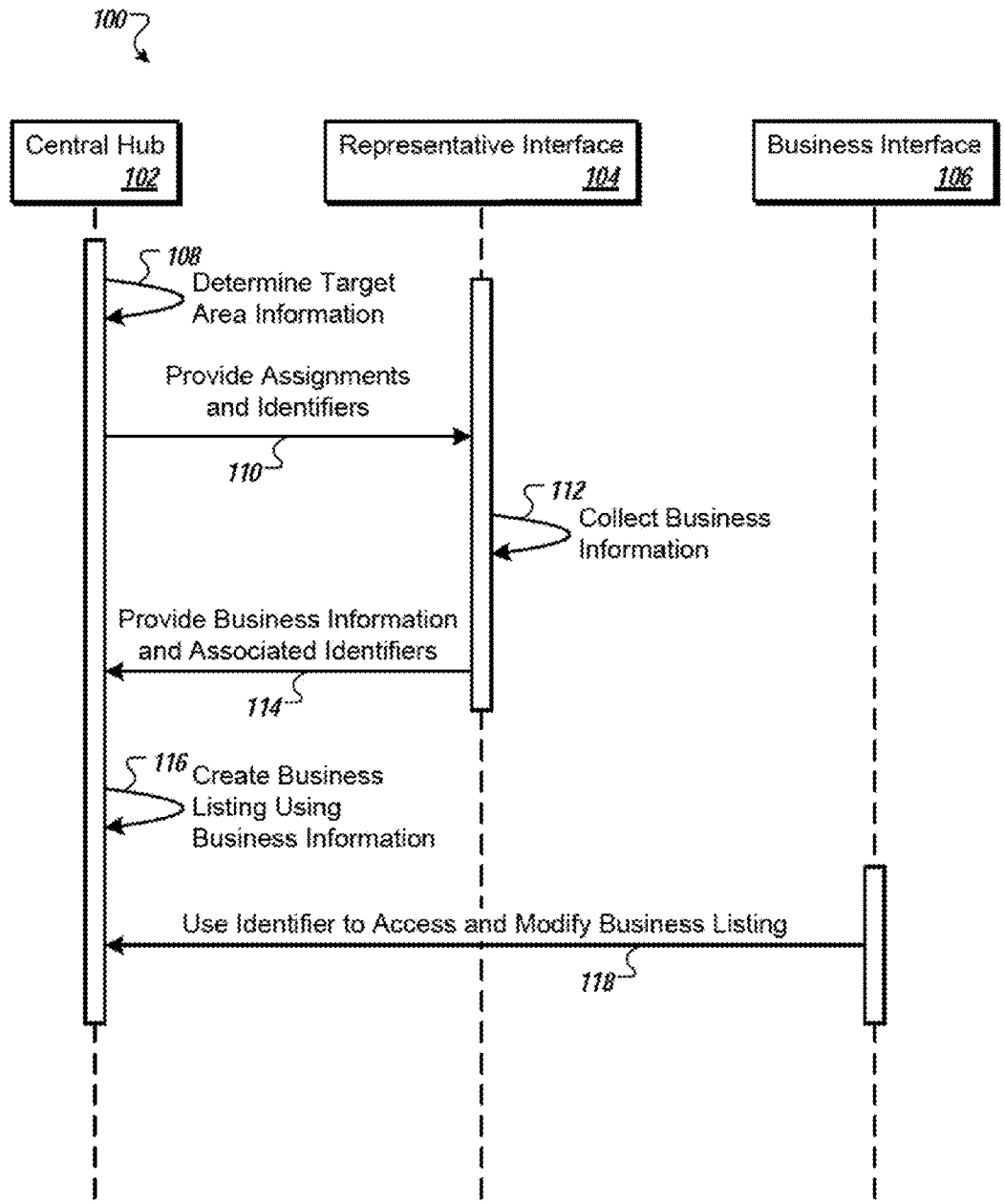
FIG. 1B is a sequence diagram showing an example of actors and steps in a process for distributed information collection.

FIG. 1B is a sequence diagram showing an example of actors and steps in a process 100 for distributed information collection. The steps can be performed, for example by the system 50 and users of the system 50. The actors include a central hub 102, a representative interface 104, and a business interface 106. The process 100 begins with the central hub 102 determining (108) target area information. For example, the central hub 102 can determine a portion of a city, such as a region bounded by streets or other landmarks, having businesses from which information is to be retrieved by representatives. In some implementations, the target area information also includes a list of businesses from which information has already been collected, so that those businesses are not processed again by a representative. In some implementations, the target area information includes a set of pre-generated identifiers to be associated with business information gathered by a representative.

In some implementations, the target area information includes a script from which a representative can read while interacting with a business. In some implementations, the target area information includes one or more handouts to provide to the businesses. For example, the handouts can include a sign the business can post indicating that the business has an entry in the online business listing. In another example, the handouts can include instructions the business can follow to access or update its information in the online business listing.

The central hub 102 provides (110) the target area information to the representative interface 104. In some implementations, the target area information provided to the representative interface 104 includes assignments of specific areas at which business information is collected and identifiers to be associated with the businesses from which the information is collected. For example, the identifier generator application 65 can generate the identifiers and provide them to the representatives. In some implementations, the representative interface 104 can be operated by an agency that distributes the assignments and identifiers to individual representatives for use in collecting business information. Alternatively, the representative interface 104 can be operated by an individual representative.

A representative receives the target area information from the representative interface 104 and collects (112) business information for businesses in the target area. The representative provides the business information to the representative interface 104. The business information can include documents or other items provided by the business, such as a business card, an invoice, or a stamp. The business information can also include other information, such as a form that identifies a name of the business, an address of the business, an electronic mail (email) address of the business, a website address of the business, a telephone number of the business, and a description of the business. The business information and/or form also includes one of the pre-generated identifiers to be associated with the business. The business information can include other information, such as a picture of the business and/or a geographic location of the business.

The representative interface 104 provides (114) the business information to the central hub 102. For example, the business card, invoice, stamp, and/or picture can be scanned or otherwise converted to electronic format if in hardcopy form and then sent to the central hub 102. Further, where the form and/or geographic location (e.g., a mark on a map) is in a hard copy form, the form data and location can be recognized using optical character recognition (OCR) or entered into the representative interface 104 and sent to the central hub 102. In one example, the representative can use the hardcopy of the map showing the location of the business to lookup the location using an online map service and to determine the latitude and longitude of the business.

In some implementations, the representative can input business information directly into an electronic form while at the business without using a hardcopy form, such as with a smart phone, personal digital assistant (PDA), or other mobile or portable computing device. In some implementations, the representative can take a picture using a mobile or other portable device, such as a digital camera, PDA, or smart phone. In some implementations, the representative can identify the geographic location of the business using a device that accesses a global positioning system (GPS). In some implementations, an electronic picture of the business can be geo-tagged with the coordinates of the business. The geo-tagged picture can then be used by the central hub 102 to identify the location of the business.

The central hub 102 receives the business information for the business and creates (116) a business listing for the business. The business listing is an electronic entry in an online catalog of businesses. The business listing includes at least a portion of the business information received from the representative interface 104, such as the name, the address, the email address, the website, the telephone number, the picture, and the geographic location of the business.

A business owner, manager, or other contact person can access (118) the business listing using the business interface 106. For example, the owner can provide the pre-generated identifier, associated with the business, to the central hub 102. In some implementations, the pre-generated identifier can be used as a login or password during a user authentication process. After authentication, the owner can add, remove, or modify information in the business listing. For example, the owner can update a description of the business or add more pictures of the business.

Figure 2:
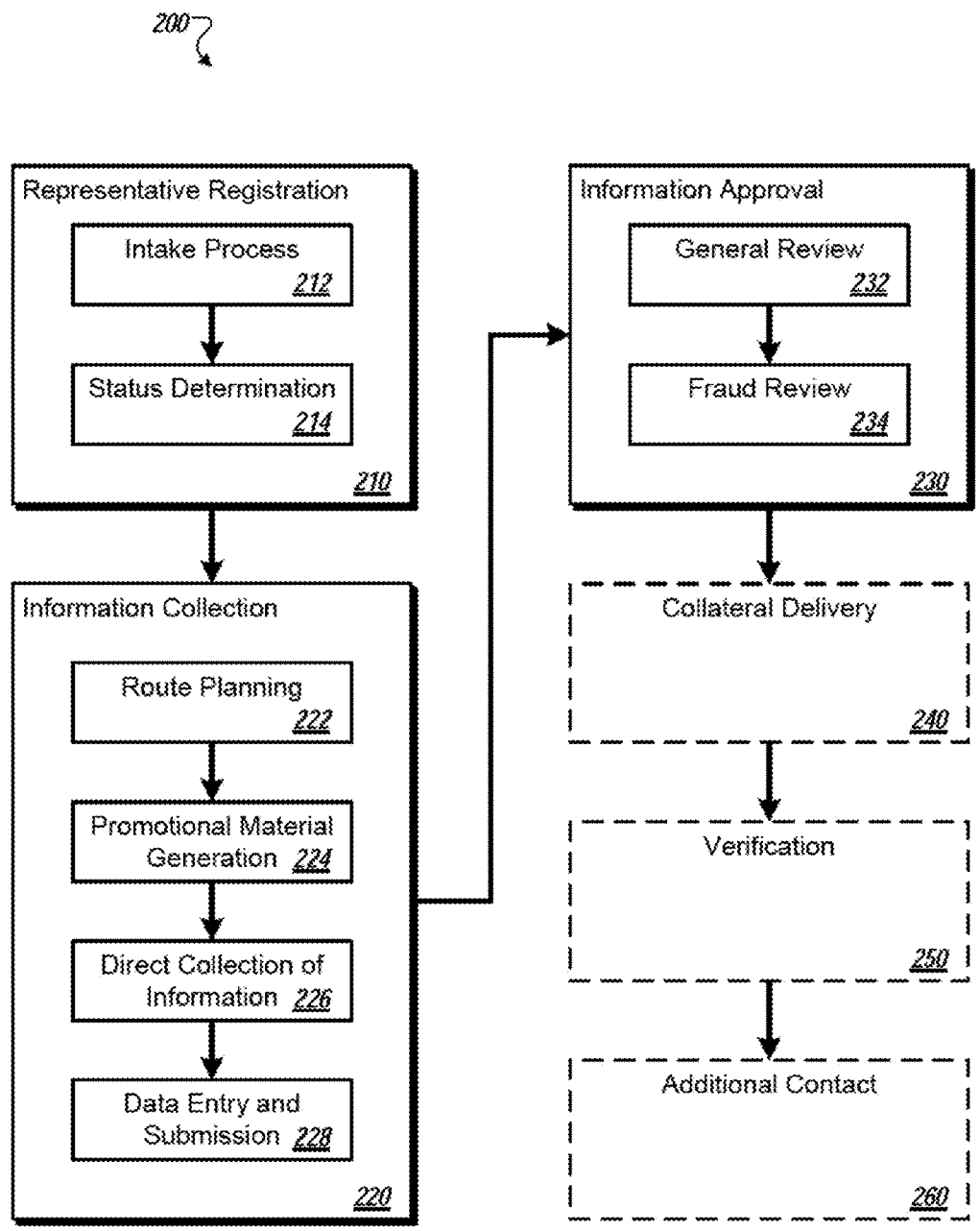
FIG. 2 is a flow chart showing an example of a process for distributed information collection.

FIG. 2 is a flow chart showing an example of a process 200 for distributed information collection. The process 200 may be performed, for example, by a system such as the system 50. For clarity of presentation, the description that follows uses the system 50 as the basis of an example for describing the process 200. However, another system, or combination of systems, may be used to perform the process 200. The process 200 begins with the step of a representative registration 210 (e.g., by the representative registration application 62). The representative registration 210 can include automated and semi-automated workforce initiation. The representative registration 210 can include acquiring remote representatives, obtaining information about obtained remote representatives, and provides for an opportunity for selection, follow-up, and training of remote representatives. The representative registration 210 can include one or more interactions with the system 50, including interactions with the representative registration application 62 and the registered representatives database 72. In some implementations, the representative registration 210 may include some (e.g., minimal) involvement of other individuals, and may require manual review, approval of submissions, error-checking, or manual confirmations, etc. Some implementations may be fully automated. In general, however, the representative registration 210 occurs with minimal to no human involvement beyond that of the representatives themselves. In some implementations, representatives will generally be independent contractors. Other implementations may utilize a combination of independent contractors and employees to perform as representatives.

In one implementation, the representative registration 210 begins with an interested person (e.g., prospective representative) entering individual information in an intake process 212. For example, the prospective representative can obtain access to the system 50 through the representative interface 54*b*, and submit a request to interact with the representative registration application 62 to complete the intake process 212. The intake process 212 can be automated, and typically involves the prospective representative entering individual information by accessing a form, for example, by way of a browser. The information entered is then stored (e.g., in the registered representatives database 72, which receives information from the prospective representative via the representative registration application 62). In some implementations, the stored information is generally accessible to additional automated or manual processes. The stored data can include information that may be used to individually identify a prospective representative, such information allowing the system to later to notify the candidate representative of acceptance, to request additional information, or for other contact purposes such as training, etc.

The representative registration 210 ends with a status determination 214 of the representative. The number of individuals approved may vary based on the program. In some implementations, an approval may be nearly immediate based on an automated review of the entered information. In other implementations, an approval may be delayed and based on a later review of the entered information (manual, automatic, or a combination), based on a queuing system, based on a needs assessment, or other criteria. In one implementation, the information stored in the registered representatives database 72 will be accessed over the system 50 for the status determination 214 of the representative. Representatives that are not approved may be maintained in the system for later possible approval, may be rejected, or otherwise categorized. In another implementation, approval of a representative may be automated and occur as part of the representative registration application 62, and only approved representatives will have information stored in the registered representatives database 72. Information for declined representatives can be removed from the system 50 when the access to the representative registration application 62 is terminated for a declined representative. In another implementation, information for declined representatives is also stored in the registered representatives database 72.

An individual may begin operating as a representative once they have been approved. In some implementations, the representative will have little or no affiliation with the approving entity in that they will typically be an independent contractor.

In one approach, automatic delivery of a materials kit is scheduled by the system once a representative is approved. In another approach, delivery of a materials kit is scheduled upon request by a representative. Other approaches may also be used. A materials kit may include, for example, an initial batch of handouts to give to businesses. In some implementations, the materials kit can include a generated sample of the collateral to be shown to businesses as an example of what the business can expect later. Other items may also be included in a material kit, such as representative identifying materials such as a badge, shirt, or hat to help identify a representative as part of the program, incentive or reward items, or follow-up information to be provided to a business. The materials kit request process may be part of the representative registration application 62, may be part of another application, or may be another application or other request over the system 50.

After a representative has been registered by the representative registration 210, the representative can begin an information collection 220 step. The information collection 220 can include one or more interactions with the system 50, including interactions with the reservation application 64, the information collection application 66, and the collected information database 74. A representative may directly gather information from a target group. One target group may be businesses. Examples of other possible target groups may include clubs, office buildings, historical buildings, other physical locations, etc.

The representative may perform a route planning 222 step as part of the information collection 220. The route planning 222 can include identifying entities within a target group. For example, in one approach, the route planning 222 may include identifying individual businesses for which information will be directly gathered. Although businesses will be used throughout the following description, a similar system can be used for other entities if other target groups are used.

As part of the route planning 222, one or more businesses may be identified using, for example, the system 50. In one approach, an address or area may be entered, and the system 50 or another system may utilize existing information (such as phone listings, business listings, etc.) to present possible businesses within a certain distance to the entered address, or possibilities within the specified area. For example, a request such as an information query may be provided to the business information application 63. The results of the request may be presented as a text list, as a list of hyperlinks, in a map format, other format, or by using a combination of formats. One approach for matching entered information with existing information is described in U.S. patent application Ser. No. 11/940,181 entitled Business Finder for Locating Local Businesses to Contact, filed Nov. 14, 2007. In another approach, initial information may be entered, and the system will attempt to match the information entered with information accessible by the system. For example, part of a business name and a city may be entered, and a list of one or more potential matches may be presented. The potential matches may be presented as a text list, hyperlink list, in a map format, other format, or a combination of formats. The matching business may then be identified further by the representative entering the partial data.

In some implementations, another aspect of the route planning 222 may include a reservation process. The reservation process can take into consideration other representatives, and allow for efficient collection of information. For example, the system 50 may include the reservation application 64 for implementing the reservation process. Once a business has been identified using the automated system, the reservation application 64 can be used to identify the business as a target associated with the representative (e.g., so that other representatives will not target the business), and thus the status of the business will be designated as reserved and associated with that representative. The reservation application 64 can have an associated list of targets and assigned representatives and use the list to screen potential new targets for a given representative. The reservation application 64 may present to a representative a map of reserved businesses. In one implementation, the reservation application 64 may present results that report the status of businesses that enable a coded display of the businesses appearing on a list or on a map, or present a coded representation for the businesses (for example, various colors may be used to visually represent different statuses). In one implementation, each business can be represented by a colored dot on a map, with the color representing the current status—for example, a first color may indicate that the business already has full information entered, a second color may indicate that another representative is already working with that business, a third color may indicate that the representative looking at the information has reserved or is working with that business, and a fourth color may indicate that no action has been taken regarding that business. Additional colors may be used for other purposes. Other coding schemes and methods of presenting data are also possible. Using the reservation application 64, a representative may be able to select a business and designate that business as reserved for that representative. The system may allow a certain number of reservations, an unlimited amount, and/or may base reservation permissions on prior history of that particular representative (e.g., query results, information stored in the registered representatives database 72, or other). The reservation may be held indefinitely, for a set period of time, or based in part on the user placing the reservation. Other reservation limits or options are also possible.

After the route planning 222 where one or more businesses have been identified, and whether or not a reservation may be placed by the system, the system may perform a promotional material generation 224 step for that business. For example, the system 50 may include the promotional material generation 224 as part of the reservation application 64. Once a business has been reserved in the reservation application 64, the promotional material may be automatically provided, or may be provided upon request from the representative. In one approach, an exemplary information page may be printed for a business to illustrate various aspects of a service or offer. The exemplary business page may include only generic information, or may combine specific business information (such as the business name) with other generic information. Other advertising or promotional material may also be generated or sent automatically by the system, and may include such items as a checklist, directions, etc.

The representative may also enter requests into the system (e.g., the system 50) to provide for self-provisioning of other materials. For example, training may be driven by requests entered by the representatives. As another example, logoed materials such as hats, shirts, cards, etc. may be delivered by entries into the system. These requests may be submitted to various applications for processing by the system 50. For example, various requests for materials may be handled by one or more of the representative registration application 62, the reservation application 64, the collateral information application 68, or another application.

In addition to materials, such as collateral and advertising, an identifier is pre-generated for each business in the target group. For example, the identifier generator application 65 can generate identifiers for businesses. In some implementations, the identifier can be generated and provided to the representative prior to collecting the business information from the business. In some implementations, the representative can request the identifier as the business information is collected, for example, by making a request to the information collection application 66 or the collateral information application 68. For example, various requests for identifiers may be handled by one or more of the representative registration application 62, the reservation application 64, the information collection application 66, the collateral information application 68, or another application.

The business can use the identifier, for example, to access the business's listing or profile in an online business directory. The access allows the business owner to update the profile for the business in the online directory. In some implementations, providing the pre-generated identifier during the information collection stage (e.g., while the representative is physically present at the business) obviates the need to later send the identifier to the business or for the business owner to then register the business using the received identifier. This can be advantageous where the business does not have a distinct or definite postal address or other reliable access to mail or email. This can also be advantageous where the business does not have access to the online directory system (e.g., does not have Internet access or access to a telephone).

The representative performs a direct collection of information 226 from the business. The representative delivers a pre-generated identifier to the business during the direct collection of information 226. Optionally, the representative may deliver exemplary material or other advertising or promotional information to the business while collecting information. The representative may collect a variety of information such as the physical address, identifying a contact address and phone number, identifying a website, email address, or other virtual or online identifying information, business hours, taking a picture of the external view of the business, taking an internal picture, submitting comments or a review, or other information. In one approach, the representative will collect information regarding the physical address, business hours, telephone number, and a photo of the outside of the business. The representative may further collect information regarding category (e.g., credit cards, checks, debit cards, etc.), and accepted forms of payment.

After the direct collection of information 226, the representative will then perform a data entry and submission 228 step. The data entry and submission 228 includes sending the collected information to the system, for example, by interaction with the information collection application 66 of the system 50. The information may be entered, for example, by using the representative interface 54c to access and enter information into a form generated as part of the information collection application 66. One or more types of data may be required to be entered before the entry may be submitted for approval. For example, the representative can be required to enter the pre-generated identifier for the particular business whose information the representative is submitting. The process of entering data may allow for uploading of information that may be tied to the entry. For example, one or more photos may be uploaded as part of data entry. Alternately, the process of entering data may allow for linking to or attaching previously uploaded data. For example, a number of photos may be uploaded as a batch. During later data entry, specific photos can be identified by the representative as corresponding to an entry for which additional data is entered. Alternatively, the representative may copy over or import the previously uploaded data as later data is added to complete the entry. When the required information has been entered, the representative may submit the entry to the system. The information collection application can store the entered data in the collected information database 74, or another database, as required.

In some implementations, the process of collecting information may include the use of a mobile device such as a cell phone, PDA, or other device that includes a camera feature or attachment, and which may be used to access the information collection application 66. For example, as a representative visits a business location, he can enter the required business information as well as take a picture of the business and upload the required data to the system 50 via the information collection application 66, from or near the business location. Direct collection of business information and data entry and submission could be combined into a single on-site process. The data could be entered into a form stored locally on the device and then uploaded, or the device could connect to a server or other remote device and the information can be entered remotely over the linked connection.

After the data entry and submission 228 by a representative, the system may review the entry. An information approval 230 step may include one or multiple stages of review, and the review may be fully or semi-automatic. The information approval 230 can include one or more interactions with the system 50, including interactions with the information collection application 66, the collateral information application 68, and the collected information database 74. In one implementation, review and approval are implemented in the information collection application 66 of the system 50, and the data held in the collected information database 74 and noted as pending until approval is finalized.

Multiple stages of review may be conducted. First, there can be a completion review, in which the system confirms that all required information has been entered. In some approaches, this review stage may be done at the same time as entry submission—that is, the system 50 will not accept a submitted entry for which all required information is not entered as part of the information collection application 66. In other approaches, the entries may have an initial review, and entries that are determined to be incomplete can be returned to the representative. Returning an entry may include sending a copy of the entry to the representative, sending a link to the entry, adding the entry to a task list accessible by the representative or other approach.

Once an entry has been determined to be complete, the system performs a general review 232. In one implementation, the data is stored in the collected information database 74, while in another implementation, the data may be passed from data entry to data approval as part of the information collection application 66. The general review 232 may include checking to see whether the entry matches another entry in the system, checking to see whether the entry was reserved by another representative, or checking the accuracy of the data entered by comparing the entered data to other available information such as online business listings. Discrepancies may be flagged for review by an approver or by the representative. As part of the review process, an entry may be matched (or attempted to match) against other prior entries (e.g., data already stored in the collected information database 74), and/or other available information by using one or more data fields. For example, the entries may be compared to entries stored in the collected information database 74 using one or more or of business name, physical address, phone number, identifier from a mapping program, the pre-generated identifier, etc.

The entry may also have a fraud review 234. The fraud review 234 may be done as part of the information collection application 66, may be part of another application or request system, or may be done as part of another application on a periodic review of entered data. In one implementation, the fraud review 234 may compare the current entry against other entries stored in the collected information database 74 that were entered by the same representative. One or more data fields may be compared to those in prior entries. In one approach, entries are compared singly on a data field level—for example, comparing to look for matching phone numbers, physical addresses, entered information such as photos, etc. In another approach, entries are compared on a dataset level, such that patterns of fraudulent data entry may be detected, such as minimal changes to phone numbers, variations of business names, or other entry combinations that are not evident on a single paired-entry comparison basis. The fraud review 234 may flag individual entries for follow-up review, may flag all entries from a batch, or may flag the individual representative for follow-up. Follow-up may be conducted by an approver or other individual. Follow-up may also be conducted by the system in an automatic method. Such automated methods may include sending all flagged entries for representative confirmation, sending all flagged entries to an approver for investigation, sending flagged entries to other representatives for checking, or another approach.

Optionally, after completing the information approval 230, the entry is considered approved and passes to an additional collateral delivery 240 stage. The entry may be added to the collected information database 74, be marked as approved, be de-marked as provisional, or noted using another approach. The additional collateral delivery 240 can include one or more interactions with the system 50, including interactions with the information collection application 66, the collateral information application 68, and the collected information database 74. Information from an approved entry can be used in creating additional collateral that is sent to the business.

Individual business information from the entry in the collected information database 74 may be combined with other generic information in preparing the collateral to be sent. For example, collateral may be generated that includes business information, as well as individual business information placed in a more generic context.

In one approach, collateral information is generated that includes the business information obtained by the representative, stored in the collected information database 74, and that has passed the information approval 230. The collateral may also further include a mock up of a search result with an advertisement for that specific business created to demonstrate what a search result and ad may look like for the business. The collateral may also include a map with the business located on the map, and showing some specific information regarding the business. The collateral may also include a picture of the business with additional information concerning that business (including information collected by the representative) showing how a search result, ad, or map request might include, or link to, a picture of the business with information about that business. The collateral may include a tear off card, or a removable sticker, that could be mailed to confirm or modify business information, or to request additional information or other follow-up. The collateral may include contact information, including phone numbers, web addresses, etc. for how to confirm or change business information, or how to request additional information or follow up.

The collateral may be automatically generated and sent once a business entry has been approved (e.g., by the collateral information application 68). For example, the system may automatically send information for preparing the collateral on a timed basis (e.g., every week, every day, etc.), on a numerical basis (e.g., in groupings of fifty, one hundred, one thousand, etc.), or using some other method. The method includes receiving a request for marketing collateral for a target business, retrieving business data responsive to the request from a listing data database, and automatically generating marketing collateral including one or more screenshot images (using the retrieved business data) that is customized to the target business. Alternatively, a list of businesses and information may be semi-automatically or manually generated on a periodic basis and sent for further processing.

The collateral may include, for example, authentic-looking mocked-up actual storefront images of the target business showing what its business listing might look like as a top search result. The collateral may be designed for presentation and delivery by mail. In one approach the collateral is a customized mailer. In another approach, the customized mailer is delivered via electronic means, and may be in the form of a graphics or PDF (Portable Document Format) file.

Optionally, after generation, sending, and delivery of collateral to a business, the business can perform a verification 250 of the business information or business profile, including modifying and correcting the information as necessary. The verification 250 can include one or more interactions with the system 50, including interactions with the information collection application 66, the verification application 69, and the collected information database 74. The verification 250 may occur using multiple methods, such as mailing confirmation (by card, sticker placed on paper, etc.), by phone (using a voice recognition system, phone choice directory, or live agents), or by online confirmation, website entry, email, or other electronic means. The verification 250 may be done by using the pre-generated identifier supplied to the business to individually identify the business. The verification 250 by the business can confirm that the information obtained by the representative is correct, and that other information, including photos, etc., is also correct for that business. The verification 250 can be another step to ensure that correct, non-fraudulent information is entered into the system. In one implementation, the verification application 69 can utilize an automated response system (either physical or electronic) to confirm the business information, and can designate the data stored in the collected information database 74 as verified. An automated or partially automated system may also be used to update the information provided by the business, and can amend the information stored in the collected information database 74 and then mark as verified. In some implementations, the business information is made available in the business listing prior to or without being verified by the business.

Optionally, after the verification 250 by the business, an additional contact 260 may be made. In some cases, the verification process may enable the business to indicate an interest in specified forms of follow-up. In other cases, generic or specific types of follow-up may be made to the business. The additional contact 260 can include one or more interactions with the system 50, including interactions with the information collection application 66 and the collected information database 74. For example, a request or query may be processed by the system 50, including access to the collected information database 74 to obtain information regarding data entries that have been marked as verified by the verification application 69. The additional contact 260 may involve a follow-up discussion of services that may be available to the business, offers to the business, or information regarding additional steps that a business may take. In one approach, follow-up information regarding advertising that may be available to the business may be presented.

Follow-up may occur using various methods. The representative discussed earlier may return to offer or present additional information. The follow-up may be done by a different representative or by employees of the advertising service. The follow-up may also be automated in nature, either by automated generation of mailers, email, or phone messages. Follow-up may be conducted live, by phone contact, or by electronic means.

Typically, selected representatives will be compensated on the basis of work performed. Representatives can initially register using the representative registration application 62 of the system 50, and information concerning the representatives can be stored in the registered representatives database 72. Alternatively, an agency external to the system 50 can provide registration, evaluation, and compensation of the representatives. Compensation and other interactions with the representatives (including level designation) may be handled by aspects of the representative registration application 62, by other applications (e.g., by a representative management application), or as the result of requests by representatives or users of the system 50, and may include interactions with the registered representatives database 72 and the collected information database 74.

Compensation or recognition may be based on various methods. For example, compensation may be based on how many businesses respond to the follow-up contact, based on verification of information by the business, by approval of entries, by entry of information, or by another method. Compensation may occur at one or more stages. The flexibility of compensation enables it to be modified to encourage and reward the accomplishment of certain events. Compensation may be monetary, reward items, prestige, etc., or a combination of these. In one approach, compensation may be paid for approval of each entry, with additional compensation for verification of each entry by the business. In another approach, compensation may be paid after entry approval, verification, and response to the follow-up. The system 50 may also allow for multiple levels of representatives. Various representative levels may have different tasks, different compensation levels, different compensation schemes, etc. Changes from one level to another may be based on various criteria. For example, a representative may progress to a level two representative after approval of one hundred entries, or after verification of one hundred listings, or by other criteria. Additionally, a level two representative may have additional tasks available. For example, a level two representative may conduct in-person or phone follow-up with businesses, while a level one representative cannot. Similarly, a level three representative may have other available tasks, such as ongoing support to businesses that responded to follow-up offers, and participation in various programs, such as advertising, etc. Other levels of representative are also possible. Representatives may be independent contractors or employees at different levels.

Figure 3A:
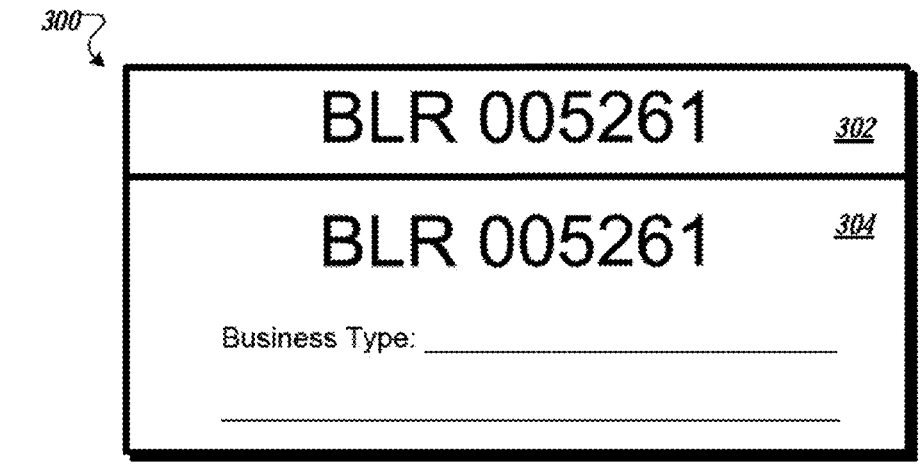

FIG. 3A shows an example of a pre-generated identifier 300. In some implementations, the pre-generated identifier 300 includes an abbreviated name of the city or target area for the business information collection. In some implementations, the pre-generated identifier 300 also includes a number that is unique within the particular target area for the business information collection. In some implementations, the pre-generated identifier 300 is a sticker. The sticker can have a first portion 302 and a second portion 304. The representative can remove and provide the first portion 302 to the business during the direct collection of information. The business can later use the pre-generated identifier to access and modify the business listing for the business. The second portion 304 can be retained by the representative. The representative can place the second portion on a form for recording the business information. In some implementations, the representative also records the type of the business, such as a restaurant, retail sales, or other type of business.

In some implementations, the pre-generated identifier may be provided to the representative in an electronic form and stored on a mobile or portable device that the representative brings to the business. The representative can, for example, print a handout for the business containing the pre-generated identifier using a portable printing device.

Figure 3B:

FIG. 3B shows an example of an instructional handout 310 for a business. The instructional handout 310 includes directions for later accessing the business listing for the business. The instructional handout 310 also includes a location 312 for placing the pre-generated identifier, such as the first portion 302 of the pre-generated identifier 300. In some implementations, the instructional handout 310 is created prior to identifying a particular business to which the instructional handout is given. In some implementations, the instructional handout 310 can be created during the direct collection of information from the business, such as with a portable printing device.

In some implementations, the business listing can be created while the representative is collecting the information at the business, such as with a wireless or mobile computing device. In some implementations, the representative can demonstrate to a contact person at the business the process for accessing and modifying the business information in the business listing.

Figure 3C:
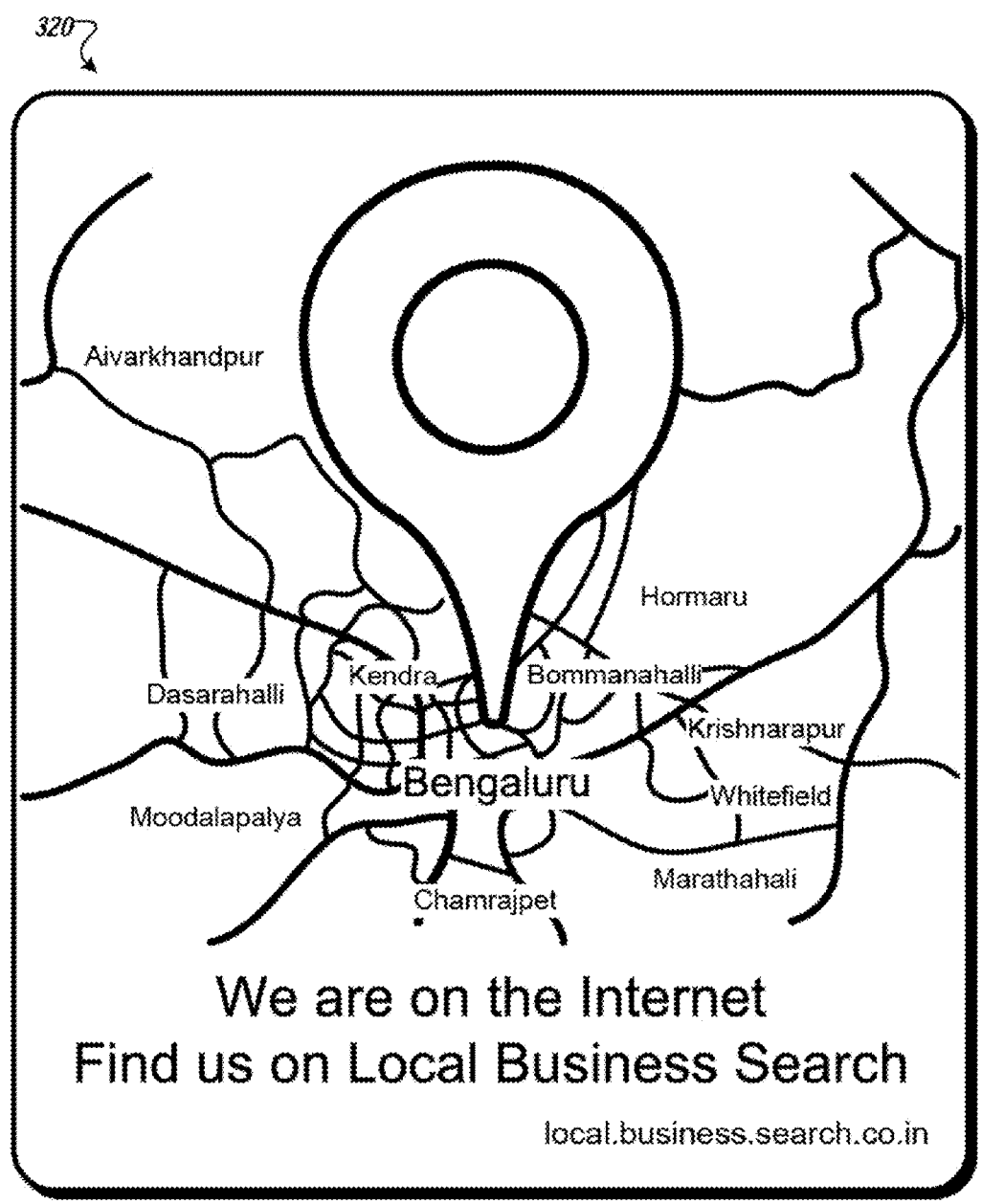

FIG. 3C shows an example of a signage handout 320 for a business. In some implementations, the signage handout 320 includes general information for the particular target area, such as the city for the target area and an Internet address of the online business directory. The signage handout 320 can be created prior to collecting information from the businesses. Alternatively, the signage handout 320 can be created by the representative or transmitted to the representative while the representative is at the business. For example, the representative can print the signage handout 320 provide it to the business. The signage handout 320 can be tailored to the business, such as by placing an indicator on a map that shows the location of the business or by providing a complete Internet address to the listing for the business in the online business directory.

FIG. 3D shows an example of a form 330 for recording business information. The form 330 can be a hard copy form or an electronic form. The representative can record the business information using the form 330, such as by writing on a hard copy form or entering the data in an electronic form. Alternatively or in addition, the representative can attach a business card, invoice, stamp, or other material provided by the business to the form 330. The representative can then later input the information from the material provided by the business into the collected information database 74 using the information collection application 66. The representative can also place the second portion 304 of the pre-generated identifier 300 on the form 330. In some implementations, attaching the material from the business and the second portion 304 of the pre-generated identifier 300 to the form 330 ensures that the business is properly associated with the pre-generated identifier 300.

Figure 3E:
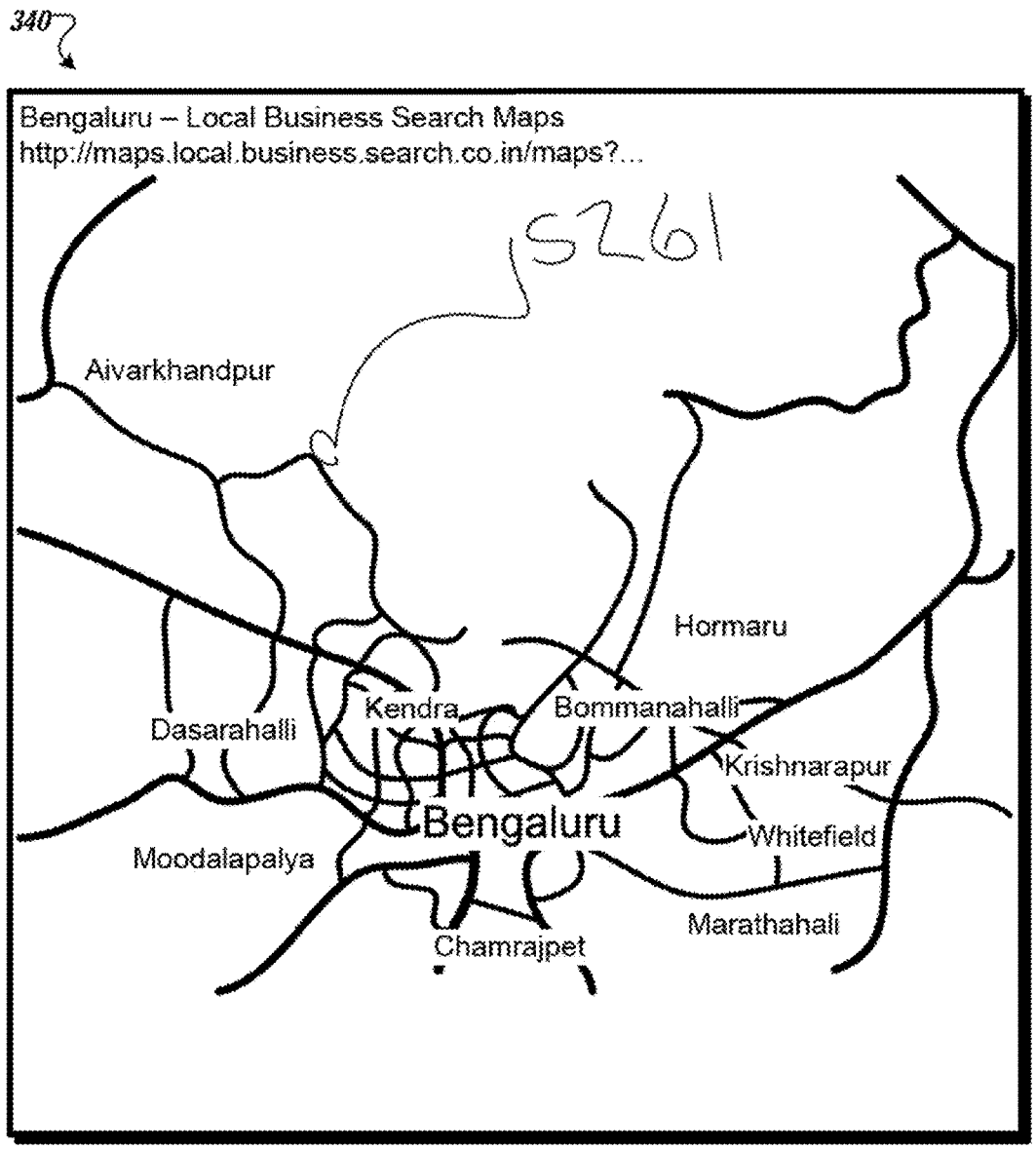

FIG. 3E shows an example of a map 340 for recording a location of a business. For example, the map 340 can be a hard copy map including the target area to be covered by the representative. The representative can record the location of the business on the map 340 while collecting the information from the business. The representative can then later lookup coordinates or an address of the business by comparing the location recorded on the map 340 with, for example, an online mapping system. Alternatively, the map 340 can be an electronic form provided by a mobile device in which the representative selects the location of the business. Alternatively, the location of the business can be automatically determined using, for example, a GPS device.

Figure 4:
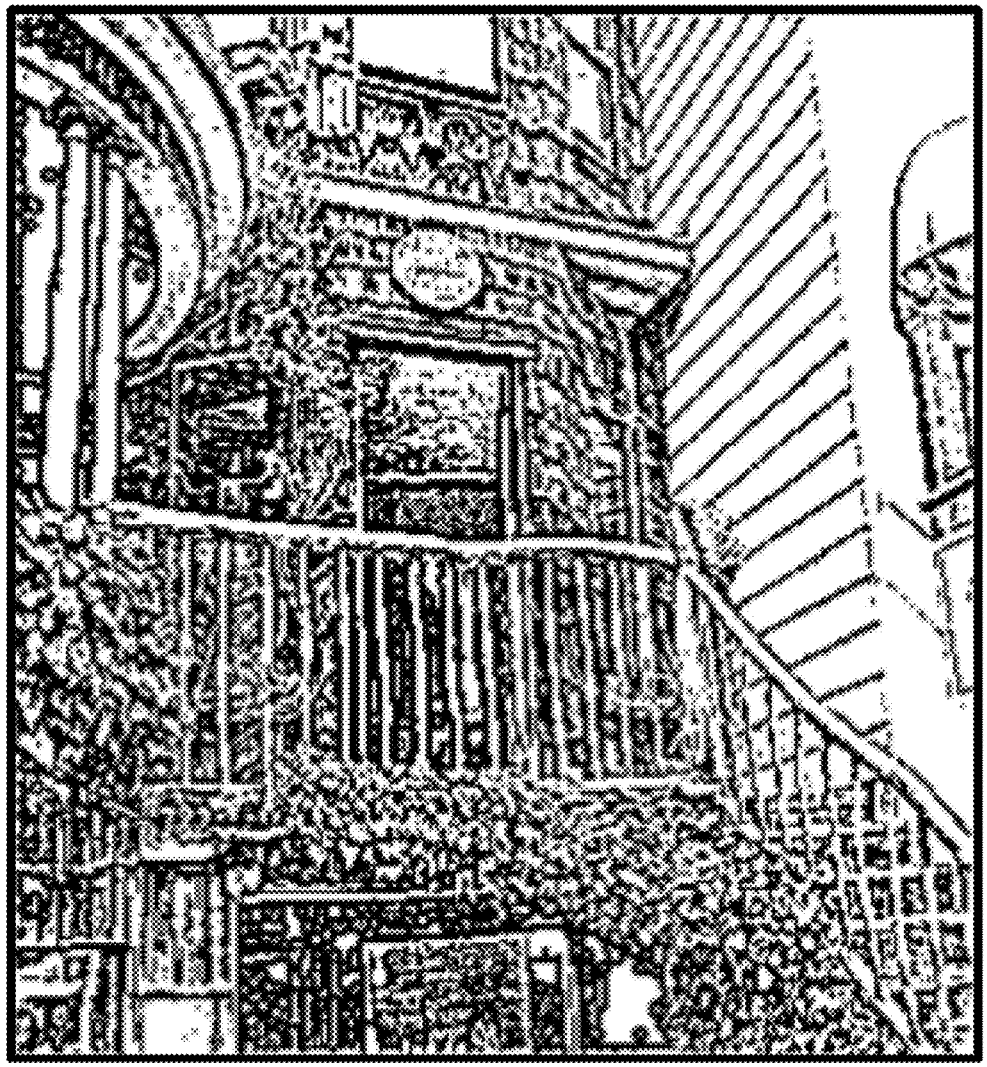
FIG. 4 is an example of a photo of a business.

The representative can collect additional information about the business, which can include taking a photo of the business, as shown in FIG. 4. The representative can then enter the obtained information about the business, including uploading a photo of the business.

Figures 5A, 5B, 5C:
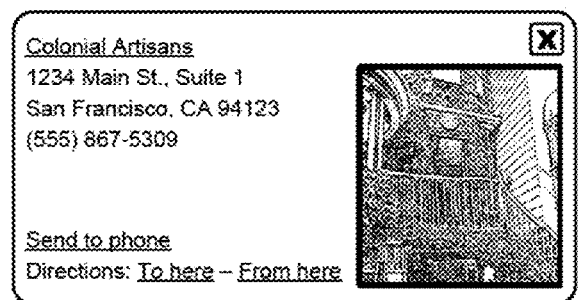
FIGS. 5A-C are user interfaces showing examples of results that include business information from various on-line resources.

Collateral may be generated and sent to the business. The collateral can include a variety of possible information. For example, the collateral sent may include a mock-up of a search result that shows the business ad as it would be placed in response to a search query, as shown in FIG. 5A. The collateral may include a map, with information on the business being shown in a pop-up display on the map, as shown in FIG. 5B. The collateral may include an expanded pop-up showing information about the business as well as a photo of the business, as shown in FIG. 5C. The collateral can also include a reminder of the pre-generated identifier given to the business during the direct collection of information. The business can use the pre-generated identifier to access and/or verify the information, such as with a mail-in response card, or a contact number to call.

The information will be made generally available such that it will appear in search results, mapping requests, etc. Examples of instances in which such results may appear include those shown in FIGS. 5A, 5B, and 5C. Additional contacts or follow-up by a representative may be made to the business.

Figure 6:
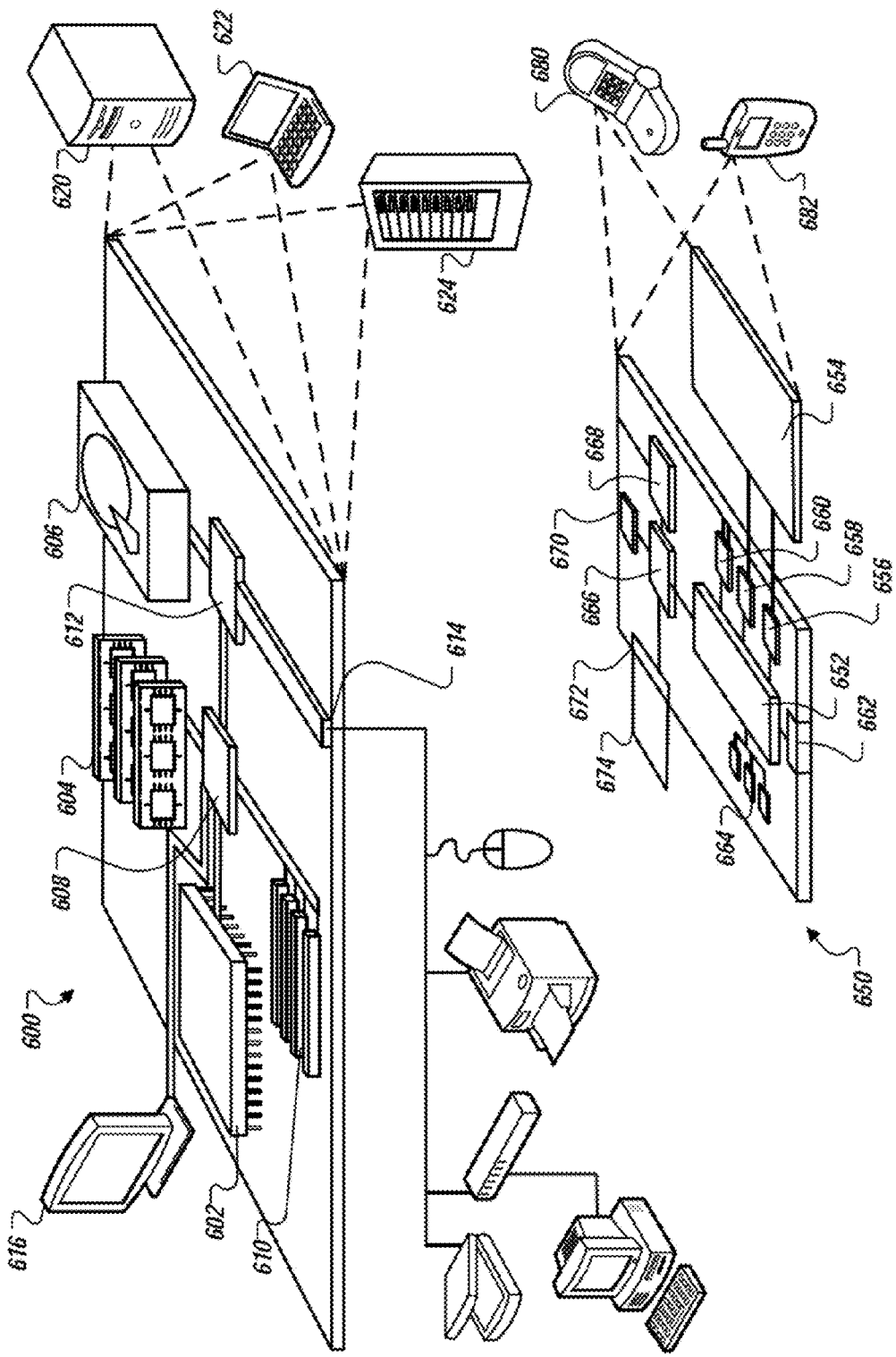
FIG. 6 shows an example of a computing device and a mobile computing device that can be used in connection with computer-implemented methods and systems described in this document.

FIG. 6 shows an example of a computing device 600 and a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on the processor 602, or a propagated signal.

The high-speed interface 608 manages bandwidth-intensive operations for the computing device 600, while the low-speed interface 612 manages lower bandwidth-intensive operations. Such allocation of functions is exemplary only. In one implementation, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a microdrive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also.

Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, the expansion memory 674, memory on the processor 652, or a propagated signal that may be received, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ad servers ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
obtaining for a collection service, at a central hub from one or more user interfaces through a network, identification information of one or more persons to collect information from businesses different from the collection service, wherein the businesses are located in target geographic areas;
for each target area:
selecting, by the central hub, one of the persons as a representative of the collection service to directly collect information from businesses in the target area, wherein the selected person is to be compensated by the collection service for collecting the information;

generating on a per target area basis, at the central hub, a set of unique identifiers for the businesses in the target area, each identifier in the set being generated to include a reference to the target area;

assigning the set of identifiers for the businesses in the target area to the representative for the target area;

receiving, at the central hub from at least one interface of the representative through a network, (i) business information that has been directly collected from a business among the businesses in the target area by the representative and (ii) an indication of a particular identifier from the set of identifiers assigned to the representative;

storing the received business information for the business with a reference to the particular identifier;

receiving, at the central hub from at least one interface of the business through the network and after storing the received business information, authentication information including the particular identifier assigned to the business; and in response to authenticating the authentication information, allowing modification of the business information for the business.

2. The method of claim 1, further comprising receiving a search request from a remote user interface, associating the search request with a particular target area, and providing business information for one or more businesses in the vicinity of the particular target area to the remote user interface including the received business information for the businesses.

3. The method of claim 1, wherein the business information comprises a name of the business, an address of the business, a phone number of the business, and geographic location information for the business.

4. The method of claim 1, further comprising conducting a review of the received business information to determine whether the information is accurate.

5. The method of claim 1, further comprising conducting a review of the received business information to determine whether the information is fraudulent.

6. The method of claim 1, further comprising receiving the business information from the interface of the representative remotely without personal or telephone contact with the representative.

7. The method of claim 1, wherein the reference to the target area in each identifier in the set is a name of a city in the target area.

8. The method of claim 1, wherein the reference to the target area in each identifier in the set is a name of the target area.

9. The method of claim 1, wherein selecting one of the persons as a representative comprises:

designating the businesses in the target area to which the representative has been selected to collect information from as reserved for the representative; and notifying other representatives that the reserved businesses are reserved for the representative.

10. A computer-implemented system, comprising:

a central hub to interface databases and applications, and that connects with at least one remote interface over a network;

a registration application to electronically obtain identification information from persons to collect business information from businesses located in target geographic areas, select at least one of the persons as a representative to directly collect the business information for each target area, and, for each target area: generating on a per target area basis a set of unique identifiers for businesses in the target area, each identifier in the set being generated to include a reference to the target area and assigning the set of identifiers to the representative for the target area; and an information collection application to receive, from the remote interface and for each target area, business information that has been directly collected from a business in the target area by the representative and to receive an indication of a particular identifier from the set of identifiers assigned to the business by the representative; and a business information database to store and associate the received business information for each business with a reference to the particular identifier assigned to the business.

11. The system of claim 10, wherein the information collection application receives the business information from the remote interface of the representative without personal or telephone contact with the representative.

12. A non-transitory computer program product, having recorded and stored thereon program code operable to cause one or more machines to perform operations, the operations comprising:

obtaining for a collection service, at a central hub from one or more user interfaces through a network, identification information of one or more persons to collect information from businesses different from the collection service, wherein the businesses are located in target geographic areas; and for each target area:

selecting, by the central hub, one of the persons as a representative of the collection service to directly collect information from businesses in the target area, wherein the selected person is to be compensated by the collection service for collecting the information;

generating on a per target area basis, at the central hub, a set of unique identifiers for the businesses in the target area, each identifier in the set being generated to include a reference to the target area;

assigning the set of identifiers for the businesses in the target area to the representative for the target area;

receiving, at the central hub from at least one interface of the representative through a network, (i) business information that has been directly collected from a business among the businesses in the target area by the representative and (ii) an indication of a particular identifier from the set of identifiers assigned to the representative;

storing the received business information for the business with a reference to the particular identifier;

receiving, at the central hub from at least one interface of the business through the network and after storing the received business information, authentication information including the particular identifier assigned to the business; and in response to authenticating the authentication information, allowing modification of the business information for the business.

13. The non-transitory computer program product of claim 12, the operations further comprising receiving a search request from a remote user interface, associating the search request with a particular target area, and providing business information for one or more businesses in the vicinity of the particular target area to the remote user interface including the collected business information for the businesses.

14. The non-transitory computer program product of claim 12, wherein the business information comprises a name of the business, an address of the business, a phone number of the business, and geographic location information for the business.

15. The non-transitory computer program product of claim 12, the operations further comprising conducting a review of the received business information to determine whether the information is accurate.

16. The non-transitory computer program product of claim 12, the operations further comprising conducting a review of the received business information to determine whether the information is fraudulent.

17. The non-transitory computer program product of claim 12, wherein the business information is received from the representative remotely without personal or telephone contact with the representative.

* * * * *